United States Patent
Schiff (10) Patent No.: US 9,617,005 B1
(45) Date of Patent: Apr. 11, 2017

(54) SYSTEM AND METHOD FOR REPLACING AN ENGINE POWERED AIR CONDITIONING UNIT WITH AN ELECTRIC AIR CONDITIONING UNIT IN AN AIRCRAFT

(71) Applicant: Peter Schiff, Cookeville, TN (US)

(72) Inventor: Peter Schiff, Cookeville, TN (US)

( * ) Notice: Subject to any disclaimer, the term of this patent is extended or adjusted under 35 U.S.C. 154(b) by 528 days.

(21) Appl. No.: 13/956,349

(22) Filed: Jul. 31, 2013

(51) Int. Cl.
    *B64D 13/00* (2006.01)
    *B23P 6/00* (2006.01)
    *B64D 13/06* (2006.01)

(52) U.S. Cl.
    CPC ............ *B64D 13/06* (2013.01); *B64D 13/00* (2013.01); *B64D 2013/0603* (2013.01); *B64D 2013/0625* (2013.01); *B64D 2013/0644* (2013.01); *Y02T 50/54* (2013.01); *Y02T 50/545* (2013.01); *Y02T 50/56* (2013.01); *Y10T 29/49352* (2015.01); *Y10T 29/49716* (2015.01); *Y10T 29/49721* (2015.01); *Y10T 29/49732* (2015.01)

(58) Field of Classification Search
    CPC ......... Y02T 50/56; Y02T 50/57; Y02T 50/58; Y02T 50/54; Y02T 50/545; Y10T 29/49233; Y10T 29/49716; Y10T 29/49721; Y10T 29/49732; Y10T 29/4973; Y10T 29/49352; B64D 13/06; B64D 13/08; B64D 13/00; B64D 2013/0603; B64D 2013/0611; B64D 2013/0622; B64D 2013/0625; B64D 2013/0644; B64D 2013/0655
See application file for complete search history.

(56) References Cited

U.S. PATENT DOCUMENTS

| | | | | |
|---|---|---|---|---|
| 4,434,624 A | * | 3/1984 | Cronin et al. | 62/172 |
| 4,487,034 A | * | 12/1984 | Cronin et al. | 62/402 |
| 4,523,517 A | * | 6/1985 | Cronin | 454/74 |
| 5,193,609 A | * | 3/1993 | Cowart | 165/42 |
| 5,899,085 A | * | 5/1999 | Williams | 62/236 |
| 6,124,646 A | * | 9/2000 | Artinian et al. | 290/52 |
| 6,408,641 B1 | * | 6/2002 | Skur, III | 62/401 |
| 6,427,471 B1 | * | 8/2002 | Ando et al. | 62/402 |
| 6,526,775 B1 | * | 3/2003 | Asfia et al. | 62/402 |
| 6,629,428 B1 | * | 10/2003 | Murry | 62/401 |
| 6,681,592 B1 | * | 1/2004 | Lents et al. | 62/401 |
| 6,845,630 B2 | * | 1/2005 | Bruno et al. | 62/323.3 |

(Continued)

FOREIGN PATENT DOCUMENTS

JP      2000234789 A * 8/2000 ............. F24F 11/02

*Primary Examiner* — Essama Omgba
(74) *Attorney, Agent, or Firm* — La Morte & Associates P.C.

(57) ABSTRACT

A system and method of altering the air conditioning system in an aircraft so that the air conditioning system is electrically powered rather than engine powered. The aircraft is rid of the air conditioning components that are dedicated to the engine powered system. A new electric compressor, evaporator and condenser blower assembly are then installed. Heat exchanger units are installed in the areas of the aircraft that are to be cooled. The new air conditioning system has two circulatory loops. In a refrigerant loop, refrigerant is circulated between the electric compressor, evaporator and condenser. This cools the evaporator. The evaporator is then used to cool circulating liquid coolant. The coolant is circulated to the heat exchange units.

14 Claims, 6 Drawing Sheets

(56) References Cited

U.S. PATENT DOCUMENTS

| | | | |
|---|---|---|---|
| 6,857,602 B1* | 2/2005 | Grosskrueger et al. | 244/117 A |
| 6,928,832 B2* | 8/2005 | Lents et al. | 62/401 |
| 7,305,842 B1* | 12/2007 | Schiff | 62/244 |
| 7,467,524 B2* | 12/2008 | Brutscher | B64D 13/06 62/401 |
| 7,484,689 B2* | 2/2009 | Musial et al. | 244/114 R |
| 7,572,981 B2* | 8/2009 | Koizumi et al. | 174/111 |
| 7,682,198 B1* | 3/2010 | Plattner | 439/638 |
| 8,047,903 B1* | 11/2011 | Schiff | B64D 13/06 454/71 |
| 8,136,756 B2* | 3/2012 | Duces et al. | 244/58 |
| 8,272,930 B2* | 9/2012 | Klimpel | B64D 13/02 454/71 |
| 8,839,641 B1* | 9/2014 | Plattner | 62/401 |
| 8,882,030 B2* | 11/2014 | Loison | B64D 13/06 244/53 A |
| 8,915,095 B2* | 12/2014 | Bruno | B64D 13/06 62/333 |
| 8,936,071 B2* | 1/2015 | Bruno et al. | 165/104.19 |
| 8,973,393 B2* | 3/2015 | Atkey et al. | 62/401 |
| 2004/0011918 A1* | 1/2004 | Musial et al. | 244/1 R |
| 2004/0014419 A1* | 1/2004 | Lents et al. | 454/237 |
| 2004/0060317 A1* | 4/2004 | Lents et al. | 62/401 |
| 2007/0056761 A1* | 3/2007 | Koizumi et al. | 174/111 |
| 2008/0032616 A1* | 2/2008 | Vogel | 454/74 |
| 2009/0000328 A1* | 1/2009 | Scherer et al. | 62/335 |
| 2010/0029190 A1* | 2/2010 | Dessero | B64D 13/08 454/76 |
| 2010/0193630 A1* | 8/2010 | Duces et al. | 244/58 |
| 2016/0257410 A1* | 9/2016 | Bruno | B64D 13/02 |

\* cited by examiner

SYSTEM AND METHOD FOR REPLACING AN ENGINE POWERED AIR CONDITIONING UNIT WITH AN ELECTRIC AIR CONDITIONING UNIT IN AN AIRCRAFT

BACKGROUND OF THE INVENTION

1. Field of the Invention

In general, the present invention relates to air conditioning systems used in aircraft. More particularly, the present invention relates to after market air conditioning systems that are used to upgrade and replace air conditioning systems that had been manufactured for installation in aircraft.

2. Prior Art Description

The present invention relates to private aircraft or small commercial aircraft that have turbine (turboprop or jet) or piston engines. Examples of such aircraft would be the King Air Aircraft manufactured by Beechcraft Corporation of Wichita, Kans. Many such aircraft have air conditioning units that are powered by the engines of the aircraft. For example, the King Air series 200 & 300 aircraft are twin-engine aircraft that have their air conditioning units run by the right engine on the aircraft.

The problems associated with having an air conditioning unit powered by an aircraft engine are self-evident. That is, the engine of the aircraft must be running in order for the air conditioning unit to function. Accordingly, if the aircraft is just sitting on the tarmac of an airport on a hot day, the right engine must be kept running in order to keep the cabin cool. This involves issues of noise, expensive aircraft fuel, safety, and additional maintenance.

Aircraft engines do not operate at their highest efficiency when running at idle. Consequently, an aircraft owner can expend a significant amount of fuel just running the engines for air conditioning purposes. Furthermore, aircraft engines require maintenance after surpassing a certain number of operating hours. Thus, aircraft that run at idle just to provide air conditioning require maintenance more often than aircraft that are not run at idle.

Many aircraft are manufactured with electric air conditioning systems. When such aircraft are parked on an airport tarmac, those aircraft can be powered by means of an external electrical extension cord while the aircraft engines are shut off. However, typical aircraft air conditioners require over 100 amperes of 28-volt direct current power. This requires the use of a converter that can convert the incoming alternating current to the required direct current. Even higher amperage is drawn in the initial starting stages of the air conditioning systems. As such, simply connecting an extension cord is not a solution since such amperages surpass the capacity of small diameter extension cords and the power circuits they are plugged into. Rather, to provide power to an aircraft on the tarmac, often a motorized generator must be provided or a large voltage conditioner must be used that is connected to a high power line source through a heavy extension cord.

A need therefore exists for an economical system that enables an airplane with an engine powered air conditioning system to be converted into an airplane with an electrical air conditioning system. A need also exists for a variable power air conditioner system that can be operated at reduced current levels from conventional 120-volt power outlets. Yet a further need exists for an air conditioning system for an aircraft that has a "soft-start" means so that high starting current requirements are eliminated. Furthermore, a need exists for compact power converter installed right on the aircraft that transforms ordinary alternating house power to 28-volt direct current aircraft power. In this manner only an extension cord is required to pre-cool the aircraft while it is sitting on the tarmac.

These needs are met by the present invention as described and claimed below.

SUMMARY OF THE INVENTION

The present invention is a system and method of altering the air conditioning system in an aircraft so that the air conditioning system is electrically powered rather than engine powered. The aircraft is first transformed by removing many of the air conditioning components that were dedicated to the engine powered system. These components include the mechanically driven compressor, the evaporator and the blowers used for the condenser. A new electric compressor, evaporator and condenser blower assembly are then installed. Furthermore, heat exchanger units are installed in the areas of the aircraft that are to be cooled. The new air conditioning system has two circulatory loops. In a refrigerant loop, refrigerant is circulated between the electric compressor, evaporator and condenser. This cools the evaporator. Another or the same evaporator is then used to cool circulating liquid coolant. The coolant is circulated to the heat exchange units, therein providing air conditioning to the areas of the aircraft in which the heat exchanger units are present.

The newly installed system utilizes a liquid coolant, such as a 50% ethylene glycol anti-freeze solution. The liquid coolant enables cooling without the need for large diameter air ducts, since the liquid coolant has many times the cooling capacity as does forced air. This allows cooling in aircraft that do not have the necessary spacing to incorporate large area air ducts. In particular, this applies to the new technology composite aircraft that utilize thin walled cabins, as compared to aluminum structures.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention air conditioning conversion system can be customized to the specific needs of a variety of different aircraft, the embodiment illustrated shows the system being applied to a Beechcraft King Air Series 200/300 airplane. This embodiment is selected because of the large number of such aircraft in service. The illustrated embodiment, however, is merely exemplary and should not be considered a limitation when interpreting the scope of the appended claims.

Figure 1:
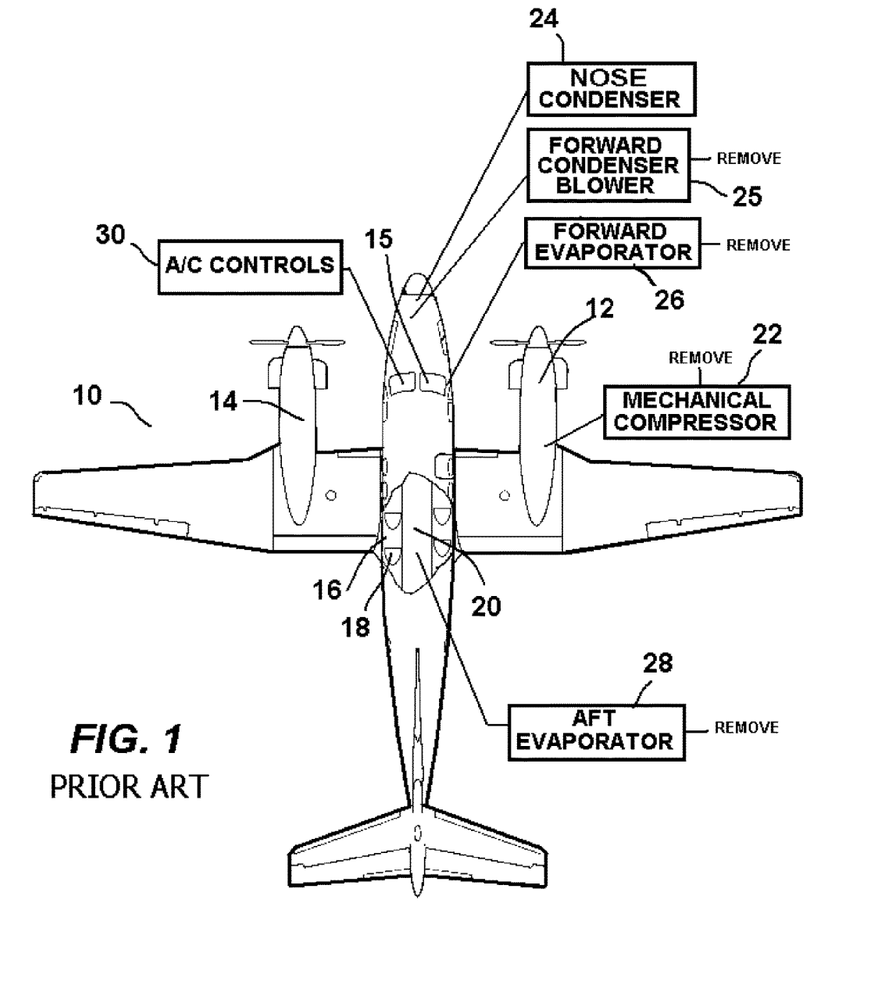
FIG. 1 is a schematic of a an airplane with a prior art engine-powered air conditioning system.

Referring to FIG. 1, a schematic of a prior art air conditioning system aircraft 10 is shown. The aircraft 10 is a Beechcraft King Air-200/300 Series aircraft. Such an aircraft 10 has both a right engine 12 and a left engine 14 that are mounted on opposite wings. The aircraft 10 has a cockpit 15 and a passenger cabin 16 that are cooled by a right engine-powered air conditioning system. The passenger cabin 16 typically is configured to have seats 18 on opposite sides of a center isle 20.

The engine-powered air conditioning system consists of a mechanical compressor 22 that is mounted to the right engine 12 and is powered by the operation of the right engine 12. Thus, the right engine 12 of the aircraft must be kept running in order to power the mechanical compressor 22 and to keep the air conditioning system functioning. The air conditioning system also contains a nose condenser 24, a forward condenser blower 25, a forward evaporator 26, and an aft evaporator 28. The air conditioning system circulates traditional refrigerants. The air conditioning system is used to cool air, which is then forced into the passenger cabin 16 and the cockpit 15 through various ducts below the cabin floor, within the passenger/pilot partition, within the outer walls and overhead panels of the aircraft to similarly positioned low lying and high positioned vents. Thus, the aircraft 10 is cooled to a large degree from the bottom up when the air conditioning system is in operation.

The pilot controls the air conditioning system using A/C controls 30 mounted to an instrumentation panel within cockpit 15. From the A/C controls, the pilot can activate, deactivate, and control the settings of the overall air conditioning system.

The present invention is a system and method that alters the prior art air conditioning system of FIG. 1 and converts it to an electrical system that does not reply upon the running of either aircraft engine 12, 14 to operate. The remainder of the aircraft 10 remains the same.

Figure 2:
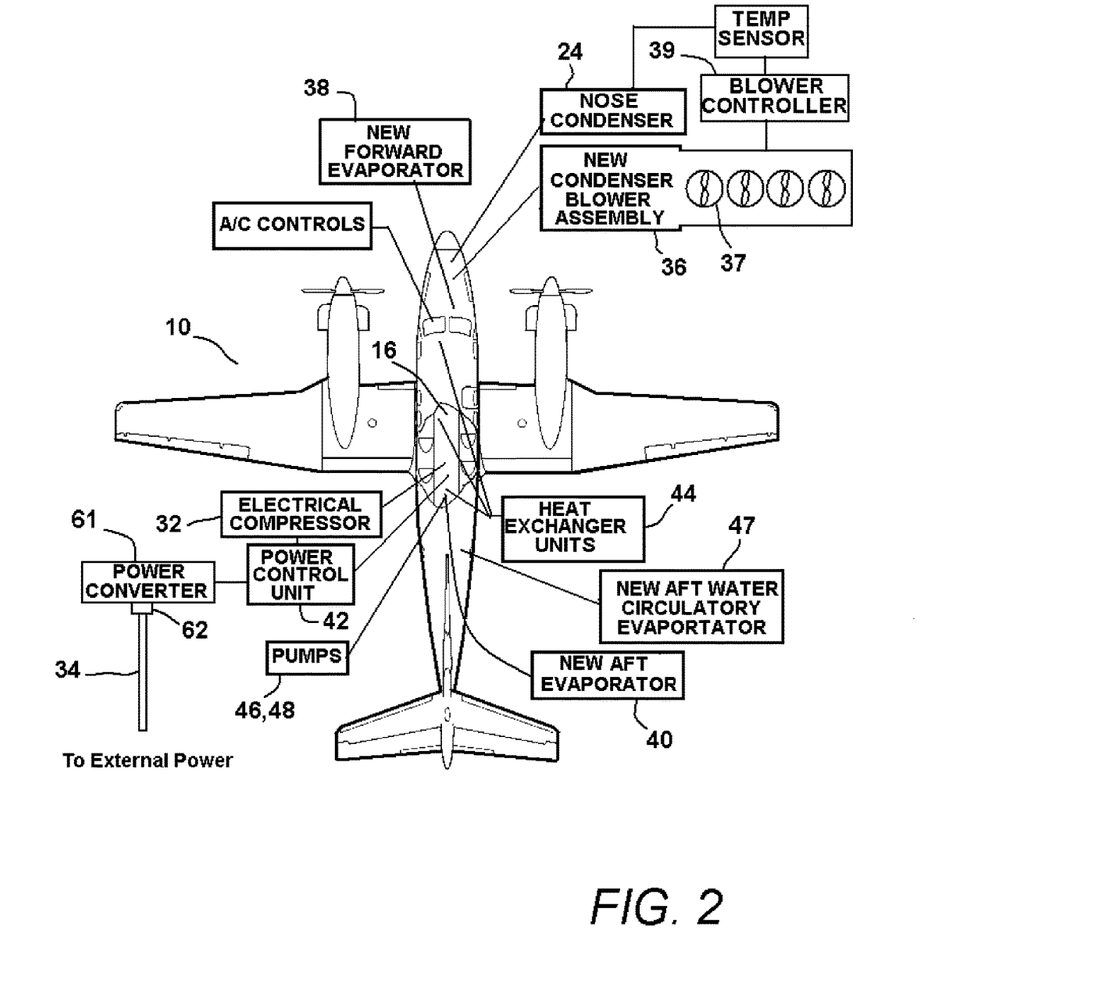
FIG. 2 is a schematic of the same aircraft as shown in FIG. 1 with the present invention electric air conditioning system.

Referring now to FIG. 2 in comparison with the prior art configuration of FIG. 1, it can be seen that the present invention system retrofits the air conditioning system of the aircraft 10. The present invention system includes an electric compressor 32. Once installed, the electric compressor 32 can be run from power provided to the aircraft 10 by an external extension cord 34, as will be later explained in more detail.

In addition to an electrical compressor 32, the aircraft 10 is refit with a new electric condenser blower assembly 36, a new forward evaporator 38, a new aft evaporator 40, an electrical power control unit 42, heat exchanger units 44, and cooling fluid circulating and condensate pumps 46, 48. An optional aft water circulator evaporator 47 many also be installed. These components enable the air conditioning system to run off the electrical system of the aircraft 10 when the aircraft 10 is in flight and off an external extension cord 34 when the aircraft 10 is on the tarmac.

The electric condenser blower assembly 36 contains multiple independent blowers 37 and a blower control 39. The blower control 39 senses the temperature of the nose condenser 24 and progressively turns on from one to all of the blowers 37, depending on the temperature sensed. This unique feature enables the present invention air conditioning to work efficiently when the cabin temperature is elevated and the ambient outside air temperature is low. This also enables the refrigeration "change of state" vapor cycle under normally adverse conditions, for maximum efficiency of the system. The power converter 61 may be mounted in the aircraft so that extension cord 34 can connect directly to a plug on the aircraft.

Figure 3:
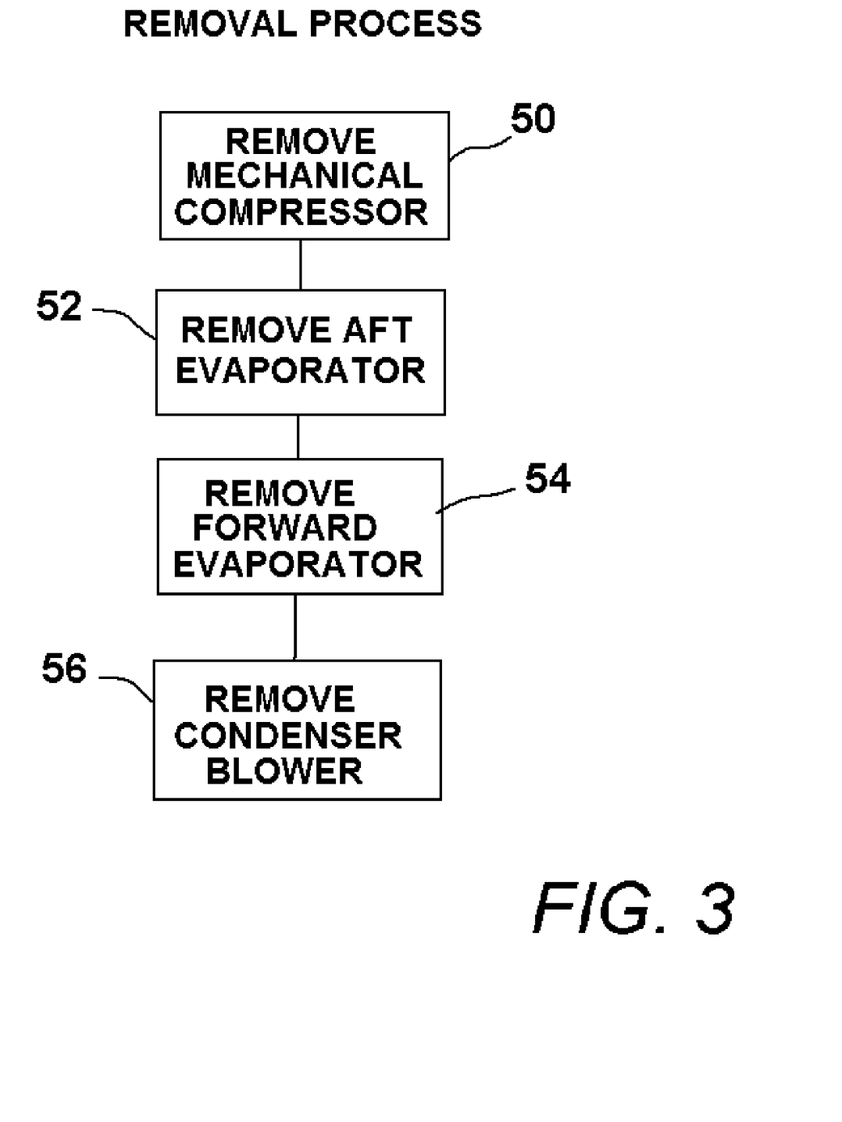
FIG. 3 is a block diagram showing the method steps of removing air conditioning components from an aircraft.

Referring to FIG. 3 in conjunction with FIG. 1 and FIG. 2, it will be understood that the first step in converting an aircraft 10 from an engine driven air conditioning system to an electric air conditioning system is to remove the original mechanical compressor 22 from the engine 12. See Block 50. The removal of the mechanical compressor 22 involves more than just unbolting the mechanical compressor 22. The removal of the mechanical compressor 22 leaves open refrigerant lines and gear box openings. The refrigerant lines are drained and plugged. Furthermore, any gearbox openings or engine port openings are closed with the appropriate cover plates.

As is indicated by Block 52, the aft evaporator 28 is then removed from the aircraft 10. This also involves the removal of supporting auxiliary components, such as the power relay for the aft evaporator 28, a blower, and various brackets that support such components. Likewise, as is indicated by Block 54, the forward evaporator 26 and its auxiliary components are removed from the aircraft 10.

The forward condenser blower 25 next to the nose condenser 24 is removed. See Block 56. The nose condenser 24, however, is left in place. Supporting auxiliary components, such as the blower solenoid relay and support brackets are also removed since they are no longer needed.

Figure 4:
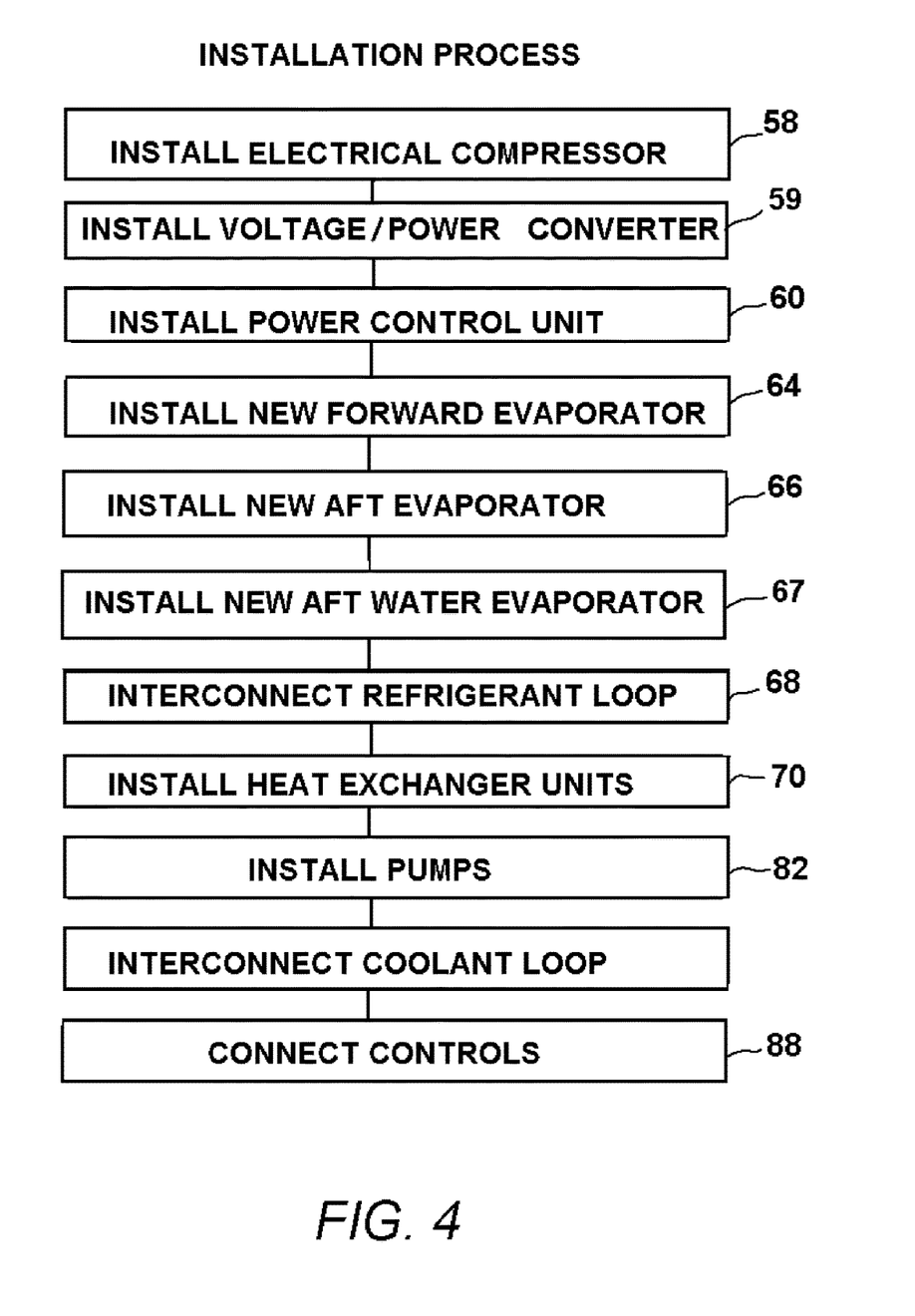
FIG. 4 is a block diagram showing the method steps of installing the present invention electric air conditioning system into an aircraft.
Figure 5:
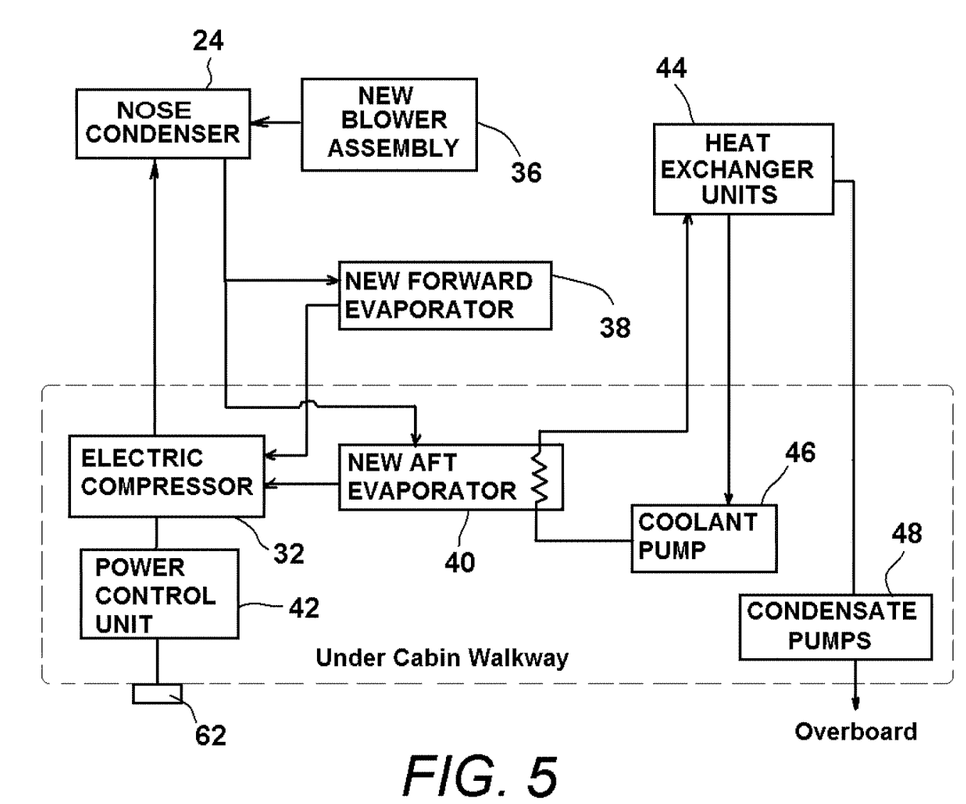
FIG. 5 is a schematic showing the operational components of the electric air conditioning system.

Once the old unnecessary air conditioning components are removed, the new components of the electric air conditioning system are installed. Referring to FIG. 4 and FIG. 5 in conjunction with FIG. 2, it can be seen that an electrical compressor 32 is installed. See Block 58. The electrical compressor 32 is connected to the electrical system of the aircraft 10 and can be powered by the electrical system of the aircraft 10 when the aircraft 10 is in flight. A power converter 61 is installed. See Block 59. A power control unit 42 is installed. See Block 60. The power converter 61 converts 240/120 Volts A/C to the voltage requirements of the aircraft 10 (typically 28 volts). The power control unit 42 is connected to a connector plug 62 through the power converter 61 to convert the external line alternation current power to aircraft direct current power. This enables the power control unit 42 to be connected to the external extension cord 34 when the aircraft 10 is parked on the tarmac and operate the air conditioning system.

The forward evaporator 26 that was removed from the aircraft 10 is replaced with a small, more efficient evaporator 38. See Block 64. The new forward evaporator 38 does not require the purge solenoid and the purge lines of the evaporator 26 that was removed. These unnecessary components can also be removed.

A new aft evaporator 40 is also installed. See Block 66. The new aft evaporator 40 uses the refrigerant running through the electric compressor 32 to cool liquid coolant. The liquid coolant is then used to cool the interior of the cockpit 15 and passenger cabin 16, as will later be explained. If the optional new water circulator evaporator 47 is used, it too is installed. See Block 67.

Once the electric compressor, 32, new forward evaporator 38, and new aft evaporator 40 are installed, these components are joined with tubing to the existing nose condenser 24 to create a complete refrigerant loop. See Block 68. The refrigerant loop is charged with traditional refrigerant. Once charged, it will be understood that the evaporators 38, 40 will cool once the electric compressor 32 is activated.

The system is may be configured by means of an electrical valve so that the one of the evaporators is disabled automatically when the aircraft air conditioning is operated from an extension cord at reduced power levels. This allows a lower temperature in the functioning evaporator to further reduce the cabin humidity when external power is used.

The electric blower assembly 36 is mounted into the space previously occupied by the forward condenser blower 25 that was removed. The new blower assembly 36 operates when the aircraft 10 is on the ground and the electric compressor 32 is being powered from an external extension cord 34. This keeps air flowing across the nose condenser 24 when the aircraft 10 is parked. The electric blower assembly 36 preferably contains a plurality of individual blowers 37. In this manner, different blowers 37 can be activated and deactivated as required by the air conditioning requirements as explained heretofore. Furthermore, the use of a plurality of blowers 37 instead of a single variable speed fan, adds a degree of redundancy and robustness to the overall system. Furthermore, the new blowers 37 are significantly more efficient than the original fans that were removed.

Figure 6:
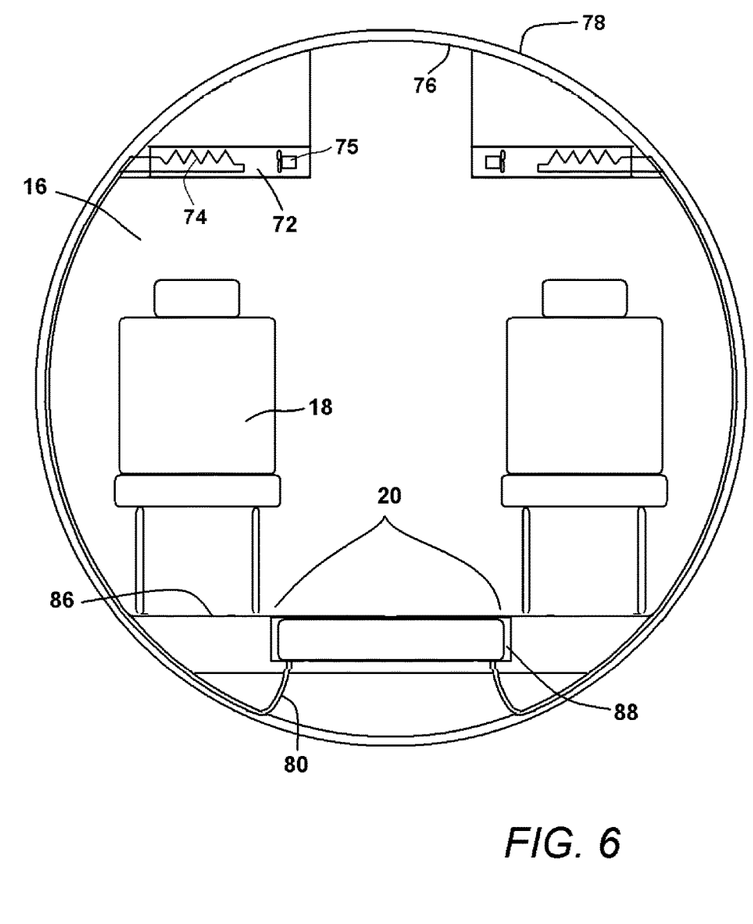
FIG. 6 shows a cross-sectional view of an aircraft fuselage to show installation locations for various air conditioning components.

Referring to FIG. 5 in conjunction with both FIG. 2, FIG. 4 and FIG. 6, it can be seen that the passenger cabin 16 is altered to accommodate the new air conditioning system. A plurality of heat exchanger units 44 are added to the aircraft 10. See Block 70. In the passenger cabin 16, the heat exchanger units 44 are preferably mounted to the head panels 72 above the passenger seats 18. The heat exchanger units 44 are very thin and consist of little more than a heat exchanger coil 74 and a fan 75. Thus, the heat exchanger units 44 can be easily inserted into the overhead panels 72 by cutting the appropriately sized openings into the overhead panels 72. A heat exchanger unit is also mounted in the restroom compartment of the aircraft 10. The heat exchanger units 44 are preferably mounted in high positions so that the heat exchanger units 44 can cool efficiently from the top down.

Small aircraft have thin walls. Only a few inches of space exist between the interior wall 76 of the aircraft 10 and the exterior fuselage 78. As such, there is no room in the exterior walls of a small aircraft to run air conditioning ductwork. This is why most small aircraft have ductwork at the bottom of the cabins and attempt to cool a cabin from the bottom up. The present invention system greatly increases the efficiency of the air conditioning system by converting it to a top down system. As has been previously explained, heat exchanger units 44 are mounted high in the various compartments of the aircraft. Thin tubing 80 is then used to circulate liquid coolant to the various heat exchanger units 44. The tubing 80 is preferably ¾-inch tubing or less. As such, the tubing 80 can easily fit into the wall space of the aircraft 10. Furthermore, since the tubing 80 is flexible, the tubing 80 can be easily led through existing openings in the walls and other structural components. The liquid coolant is preferably an antifreeze/water mixture to prevent the coolant from freezing in winter or when the aircraft 10 is at high altitudes.

The coolant is circulated through the various heat exchanger units 44 using one or more coolant pumps 46 that are installed in the aircraft 10. See Block 82. The coolant is cooled by the new aft evaporator 40, therein completing a coolant loop.

From the above, it will be understood that the present invention air conditioning system has two circulatory loops. The first circulatory loop is for refrigerant and the second circulatory loop is for coolant. In the first circulatory loop, the refrigerant is compressed by the electric compressor 32. The refrigerant passes through the original nose condenser 24 that was never removed from the aircraft 10. The refrigerant then passes through the new forward evaporator 38 and/or the new aft evaporator 40.

In the aft evaporator 40, the refrigerant is used to cool the coolant. The coolant is circulated to the various heat exchanger units 44 using one or more coolants pumps 46. The refrigerant to air evaporator 38 is used to cool the air in the cockpit 15. Since the heat exchanger units 44 may be used to cool hot humid air, condensation may collect within the various heat exchanger units 44. The condensation is collected and pumped out of the aircraft using one or more condensation pumps 48.

The nose condenser 24 being used by the air conditioning system is the same original equipment condenser manufactured into the nose of the aircraft 10. The new forward evaporator 38 is mounted into the space previously occupied by the old evaporator. However, space for the new electric compressor 32, new power control unit 42, new aft evaporator 40, and the various pumps 46, 48 is found in the aircraft 10.

This problem is solved by mounting these various components under the center isle 20 of the passenger cabin 16. In the aircraft 10, a flat deck 86 is built into the fuselage 78 so that there is a flat surface upon which the passenger seats 18 can be mounted. The center of the flat deck 86 is the center isle 20. Under the center isle 20 is an accessible compartment 88. The electric compressor 32, the new power control unit 42, the aft evaporator 40 and the various pumps 46, 48 are all mounted in this space, along with the power converter 61. Positioning these components within this space makes the installation of tubing 80 between the pumps 46 and the heat exchanger units 44 very simple. It also ensures that all coolant tubing 80 remains inside the pressurized aircraft cabin.

Lastly, the new air conditioning system is wired to the existing A/C controls 30 within the cockpit 15. See Block 88. Minor changes, in the form of switch replacements and labeling changes, are made to the A/C controls 30 to compensate for the changes in components.

It will be understood that the embodiment of the present invention that is illustrated and described is merely exemplary and that a person skilled in the art can make many variations to that embodiment. For instance, the present invention system can be applied to many types of aircraft that are not illustrated. All such embodiments are intended to be included within the scope of the present invention as defined by the claims.

What is claimed is:

1. In an aircraft having pressurized compartment containing passenger seats adjacent a center isle, overhead panels above the passenger seats, and an accessible compartment below the center isle, wherein the aircraft has an air conditioning system with a condenser and a mechanically driven compressor, and wherein said mechanically driven compressor is driven by an engine of said aircraft, a method of reconfiguring said air conditioning system, comprising the steps of:

removing said mechanically driven compressor;

installing an electric compressor into said accessible compartment under said center isle of said aircraft;

installing an evaporator into said accessible compartment under said center isle of said aircraft;

circulating refrigerant between said electric compressor, said condenser and said evaporator, wherein said refrigerant cools said evaporator;

installing heat exchanger units within said overhead panels above said passenger seats of said aircraft;

running tubing in said aircraft between said heat exchanger units and said evaporator;

circulating liquid coolant between said heat exchanger units and said evaporator, wherein said liquid coolant is cooled by said evaporator.

2. The method according to claim 1 further including the step of installing at least one pump in said aircraft to pump said coolant through said tubing, wherein said at least one pump is installed in said accessible compartment under said center isle of said aircraft.

3. The method according to claim 1, further including the step of installing an electric blower assembly in said aircraft proximate said condenser.

4. The method according to claim 1, further including the step of providing a connector port for receiving electricity from an external power cord that can be used to power said electric compressor.

5. The method according to claim 4, further including the step of providing a power control unit that conditions electricity received through said connector port.

6. The method according to claim 1, wherein said aircraft has an exterior fuselage and an interior wall, wherein said step of running tubing includes running tubing between said exterior fuselage and said interior wall.

7. In an aircraft having a pressurized compartment and an air conditioning system for cooling areas within said pressurized compartment, wherein said air conditioning system has an engine-driven compressor, a method of reconfiguring said air conditioning system, comprising the steps of:

removing said engine-driven compressor;

installing heat exchanger units within said pressurized compartment;

installing a coolant circulation system that circulates coolant to said heat exchanger units;

installing an electrically powered refrigeration system for cooling said coolant as it circulates, wherein said electrically powered refrigeration system includes an electric compressor and an evaporator that are both disposed within said pressurized compartment of said aircraft.

8. The method according to claim 7, wherein said aircraft has a condenser, wherein said electrically powered refrigeration system circulates refrigerant between said electric compressor, said evaporator and said condenser.

9. The method according to claim 7, wherein said step of installing a coolant circulation system includes the substep of running flexible tubing in said aircraft between said heat exchanger units and said evaporator.

10. The method according to claim 9, wherein said step of installing a coolant circulation system includes the substep of installing at least one pump in said aircraft to pump said coolant through said flexible tubing.

11. The method according to claim 8, further including the step of installing an electric blower assembly in said aircraft proximate said condenser.

12. The method according to claim 7, further including the step of providing a connector port for receiving electricity from an external power cord that can be used to power said electric compressor.

13. The method according to claim 7, wherein said aircraft has overhead panels and said step of installing heat exchanger units includes installing some of said heat exchanger units in said overhead panels.

14. The method according to claim 7, wherein said aircraft has a passenger isle and a compartment under said passenger isle, wherein said electric compressor and said evaporator are installed within said compartment.

* * * * *